United States Patent [19]
Kraiss

[11] 3,975,110
[45] Aug. 17, 1976

[54] FLAT BEADED DOUBLE END TRACK BIT

[75] Inventor: Gerald G. Kraiss, Brookfield, Ill.

[73] Assignee: Avildsen Tools and Machines, Inc., Chicago, Ill.

[22] Filed: Oct. 6, 1975

[21] Appl. No.: 619,838

[52] U.S. Cl. .............................. 408/228; 408/229
[51] Int. Cl.² ......................................... B23C 51/00
[58] Field of Search ........... 408/227, 228, 229, 230, 408/226, 199, 77

[56] References Cited
UNITED STATES PATENTS

| | | | |
|---|---|---|---|
| 1,131,991 | 3/1915 | Bocorselski | 408/230 |
| 2,977,828 | 4/1961 | Strickland | 408/228 |

*Primary Examiner*—Gil Weidenfeld
*Attorney, Agent, or Firm*—Allegretti, Newitt, Witcoff & McAndrews

[57] ABSTRACT

The improved flat beaded track bit disclosed herein comprises an elongated, generally rectangular member having first and second ends separated by a middle section. First and second drill bodies are formed on the first and second ends, respectively, of the member, with the drill bodies being identical, but mirror images of each other. The lands of the first and second drill bodies terminate adjacent to the middle section of the member, and the diameters of the lands of the drill bodies are larger adjacent to the first and second ends of the member than adjacent to the middle section of the member.

3 Claims, 4 Drawing Figures

U.S. Patent  Aug. 17, 1976  3,975,110
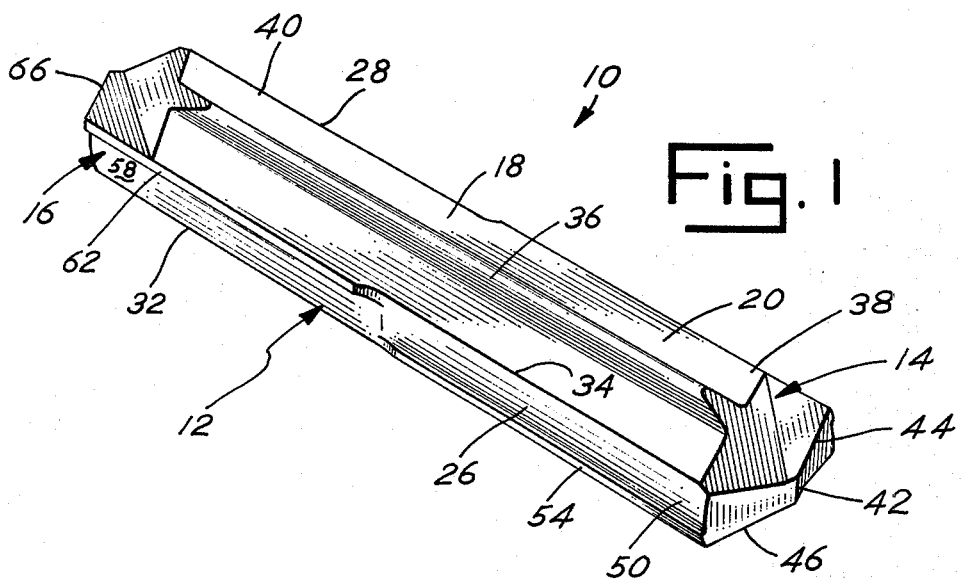
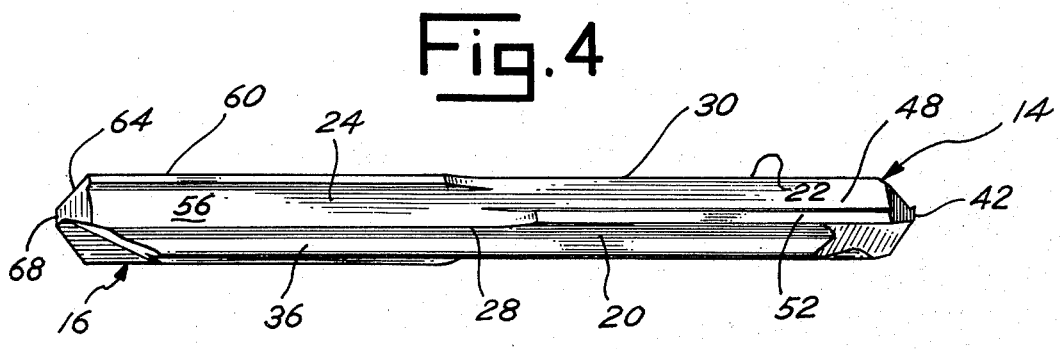
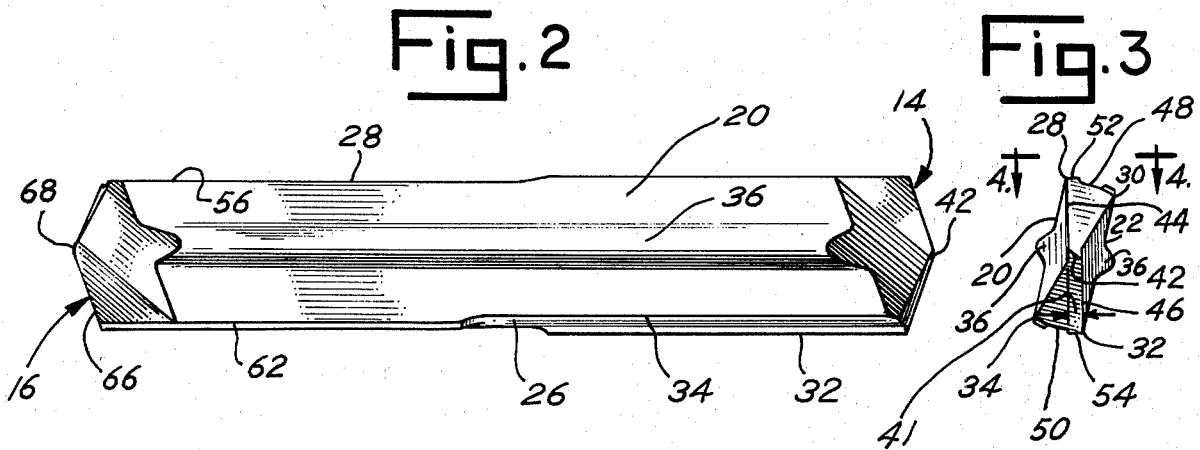

FLAT BEADED DOUBLE END TRACK BIT

BACKGROUND AND SUMMARY OF THE INVENTION

The present invention relates to an improved track bit, and more particularly, to an improved flat beaded track bit adapted for use in railroad work.

Track bits are specialized twist drills that have long been utilized for drilling holes for bolts in railroad rails in connection with heavy duty, portable track repair work in the field. For at least the past 50 years, the basic design or configuration of track bits in common usage has remained unchanged.

Aside from the fact that the prior track bits have performed reasonably satisfactorily, there are other factors which have apparently restrained or hindered innovation in the track bit art. From their first development, the design of the prior track bits, and more specifically the design of the shank portions of the track bits, have been dictated by the requirements of the holder or driver utilized with the drilling machines long used by the railroads in connection with such track repair work. Because the railroads have a relatively large capital investment in these drilling machines, any newly developed track bit must, as a practical matter, be capable of being gripped or held by these drilling machines.

Moreover, the railroads have long had conservative management and have, traditionally, been reluctant to accept innovations in tooling, particularly in those instances where existing tooling performs relatively satisfactorily. In addition, the drilling machines and track bits are utilized by largely unskilled and unsophisticated workers. Thus, any new track bit, to be acceptable by the railroads and by the railroad workers, must be generally similar, in configuration and mode of operation, to the existing track bits as well as offering significant commercial advantages.

It is a primary object of my present invention to provide an improved, novel track bit which affords twice the effective life, as compared to the track bits previously long used by the railroads, whose design is completely compatible with the drilling machines now in common usage by the railroads, and whose mode of operation is substantially unchanged from that of prior track bits. Moreover, my novel track bit can be manufactured by machine tools for substantially the same cost as the prior track bits, and thus can be sold to the railroad for substantially the same price as the other track bits.

Another object of my present invention is to provide an improved flat beaded track bit which comprises an elongated, generally rectangular member having a first end, a second end, and a middle section disposed midway the first and second ends. The member has first and second substantially flat, parallel side surfaces that extend between the first and second ends and has upper and lower, curved surfaces that extend between the first and second side surfaces and between the first and second ends. First, second, third and fourth longitudinal edges join these four surfaces.

Longitudinal beads are centrally formed on the first and second side surfaces so that the beads are parallel with the central longitudinal axis of the member. These beads, together with the flat, first and second side surfaces, constitute the shank portion of my improved track bit. This shank portion is adapted to be gripped or held by the conventional drilling machines in common usage today by the railroads so that the machines may rotate the member about its central longitudinal axis.

First and second drill bodies are formed on the first and second ends, respectively, of the member. The first drill body is the identical, mirror image of the second drill body. The lands of the drill bodies are formed on the upper and lower surfaces, with the margins of each drill body being disposed along diametrically opposed longitudinal edges. The margins extend from the ends of the member to adjacent to the middle section of the member. The diameter of each of the drill bodies, adjacent to the middle section of the member, is slightly less than the corresponding diameter of each of the drill bodies adjacent to the ends of the member.

Other objects and advantages of the improved, novel flat beaded track bit of my present invention will be apparent to those skilled in the track bit art from the following description of the preferred embodiment of my present invention, taken in conjunction with the accompanying drawings.

DESCRIPTION OF THE DRAWINGS

FIG. 1 is a perspective view of a flat beaded track bit embodying the principles of my present invention.

FIG. 2 is a side elevational view of the flat beaded track bit of FIG. 1.

FIG. 3 is an end elevational view of the flat beaded track bit of FIG. 2.

FIG. 4 is a top plan view taken along the line 4—4 in FIG. 3.

Throughout the various figures of the drawings, the same reference numerals will be used to designate the same parts or components. Moreover, when the terms "right", "left", "side", "upper" and "lower" are used herein, it is to be understood that these terms have reference to the structure shown in the drawings, as it would appear to a person viewing the drawing.

DESCRIPTION OF THE PREFERRED EMBODIMENT

Referring now to FIGS. 1–4, a flat beaded tool bit of my present invention is shown generally at 10 and includes an elongated, generally rectangular member 12. The member 12 includes: a first, right end 14; a second, left end 16; and a middle section, generally indicated at 18, disposed midway between the first and second ends 14 and 16. First and second side surfaces 20 and 22 and curved upper and lower surfaces 24 and 26 are formed on the member 12. The first and second side surfaces 20 and 22 are substantially flat, are parallel to each other and extend between the first and second ends 14 and 16. The upper and lower surfaces 24 and 26 are curved with respect to and about the central longitudinal axis of the member 12 and extend between the first and second side surfaces 20 and 22 and between the first and second ends 14 and 16.

A first longitudinal edge 28 is formed or defined by and along the intersection of the first side surface 20 and the upper surface 24. A second longitudinal edge 30 is formed or defined by and along intersection of the upper surface 24 and the second side surface 22. A third longitudinal edge 32 is formed or defined by and along the intersection of the second side surface 22 and the lower surface 26. A fourth longitudinal edge 34 is formed or defined by and along the intersection of the lower surface 26 and the first side surface 20. The longitudinal edges 28–34 all extend between the first and second ends 14 and 16 and each serves as the boundary between the two adjacent surfaces.

A longitudinal bead 36 is formed on each of the first and second side surfaces 20 and 22 and extends between the first and second ends 14 and 16. These longitudinal beads 36 are parallel to the longitudinal central axis of the member 12 and together with the first and second side surfaces 20 and 22, form or define the shank portion of the track bit 10. The shank portion of the track bit 10, i.e. the beads 36 and the side surfaces 20 and 22, are adapted to be held or gripped by the holder or driver of the conventional drilling machines now in common use by the railroads. When the track bit 10 is gripped or held by the holder or driver of a drilling machine, the machine is capable of rotating the track bit 10 about its central longitudinal axis at a relative high r.p.m.

First and second drill bodies 38 and 40 are formed on the first and second ends 14 and 16, respectively. A webb 41, chiseled edge 42 and cutting lips 44 and 46 are formed on the distal end, i.e. the end adjacent to the first end 14, of the drill body 38. The cutting lips 44 and 46 extend from the ends of the chiseled edge 42 to adjacent to the ends of the first and third longitudinal edges 28 and 32, respectively, adjacent to the first end 14. The upper and lower surfaces 24 and 26, adjacent to the first end 14, are curved so as to form or define first and second lands 48 and 50 on the first drill body 38. The first land 48 has a margin 52 which is formed in the upper surface 24 and which extends along the first longitudinal edge 28 from adjacent to the first end 14 to adjacent to the middle section 18. The second land 50 includes a margin 54 which is formed in the lower surface 26 and which extends along the third longitudinal edge 32 from adjacent to the first end 14 to adjacent to the middle section 18. The first drill body 38, as illustrated in FIG. 3, is adapted to be rotated in a counterclockwise direction, and except as noted, has generally the same shape or configuration as the drill bodies used on the prior single end track bits.

The first and second lands 48 and 50 of the first drill body 38 are tapered along the drill body 38 as one moves from the first end 14 to the middle section 18. In other words, the diameter of the first and second lands 48 and 50, adjacent to the middle section 18, is less than the diameter of the first and second lands 48 and 50 adjacent to the first end 14 so that the first drill body 38 has a slight back taper.

The second drill body 40 is an identical, mirror image of the first drill body 38. For this reason the drill body 40 will not be described herein in any detail. However, it should be noted that the second drill body 40 includes third and fourth lands 56 and 58 formed on the upper and lower surfaces 24 and 26, respectively, and that the margins 60 and 62, included on the third and fourth lands 56 and 58, extend along the second and fourth longitudinal edges 30 and 34, respectively. Moreover, the cutting lips 64 and 66 of the second drill body 40 extend from the opposite ends of its chiseled edge 68 to the distal ends of the margins 60 and 62, respectively, adjacent to the second end 16 of the member 12. In a manner similar to that of the margins 52 and 54 on the first drill body 38, the margins 60 and 62 of the second drill body 40 extend from the second end 16 to adjacent to the middle section 18 of the member 12. The diameter of the third and fourth lands 56 and 58, including the margins 60 and 62, adjacent to the middle section 18 is less than the diameter of the lands 56 and 58 adjacent to the second end 16 so that the second drill body 40 also has a back taper. As a result of its shape or configuration, the second drill body 40 is adapted to be held in the holder or driver of conventional drilling machines now in common usage by the railroads and is designed to be rotated in a counterclockwise direction, when viewed facing the second drill body The track bit 10 may be made out of high quality steel of the type normally used for prior track bits, and may be manufactured using machine tools, such as for example a grinder. A commercial embodiment of the track bit 10 is 6.250 inches in length, between its first and second ends 14 and 16, and the distance between each of the ends 14 and 16 and the middle section is 3.125 inches. The diameter of the track bit 10, as measured adjacent to the ends 14 and 16, is between 1.0585 and 1.0625 inches and each of the drill bodies 38 and 40 has a back taper of 0.003 inches. The land width is 0.375 inches, and the margin width is between 0.080 and 0.090 inches and the clearance diameter is between 0.990 and 1.010 inches in each of the drill bodies 38 and 40. Similarly, each drill body 38 and 40 has a point angle of 140°, a chisel edge of 125° and a lip relief angle of 9°.

As noted above, the cost of manufacture of the track bit 10 is not significantly greater than the cost of manufacturing a single ended prior track bit. Obviously this is a significant commercial advantage and one which the track bit art and the railroads have quickly recognized, particularly since each of the drill bodies 38 and 40 alone gives substantially the same drilling performance as the prior track bits.

With respect to the patentability of my novel track bit, I acknowledge that, initially and superficially, it may appear that my improved, novel track bit is an obvious modification of the prior single end track bits. However, a further, more detailed investigation will disclose, I submit, a contrary conclusion. My novel track bit is not just a combination of two single end track bits. Moreover, single end track bits have been used in their present form, by the railroads since the early 1900's. Yet, as far as I am aware, no one in the track bit art has ever proposed the novel track bit of my present invention although after my invention, the significant commercial advantages of my novel track bit were readily apparent to and appreciated by those in the track bit art to which my invention relates. In this regard, the art and the railroads have recognized the merits of my improved track bit and as a result, my novel track bit has already experienced considerable commercial success even though it has only been available in the market place for a few months.

In conclusion, it should be noted that my invention, as disclosed herein, may be embodied in other specific forms without departing from the spirit or central characteristics thereof. Thus the preferred embodiment of my invention described herein is, therefore, to be considered in all respects as illustrative and not restrictive, the scope of my invention being indicated by the appended claims, rather than by the foregoing description and all changes which come within the meaning and range of equivalency of the claims are thus intended to be embraced therein.

I claim:

1. An improved flat beaded track bit comprising:

an elongated, generally rectangular member having a first end, a second end and middle section, disposed midway between the first and second ends, and including first and second flat, substantially parallel, side surfaces extending between the first and second ends and curved, upper and lower surfaces extending between the side surfaces and between the first and second ends, with a first longitudinal edge joining the first side surface and the upper surface, a second longitudinal edge joining the second side surface and the upper surface, a third longitudinal edge joining the first side surface and the lower surface and a fourth longitudinal edge joining the second side surface and the lower surface and with each of the first, second, third and fourth longitudinal edges extending, from one end to the other, between the first end to the second end of the member; a first longitudinal bead formed on the first side surface, disposed midway between the first and third edges and extending between the first and third edges and extending between the first and second ends of the member; a second longitudinal bead formed on the second side surface, disposed midway between the second and fourth edges and extending between the first and second ends of the member, the first and second side surfaces, including the first and second longitudinal beads, constituting the shank portions of the track bit and being adapted to be held by a machine which may then be utilized to rotate the member about its central longitudinal axis; a first drill body formed on the first end of the body and including a centrally disposed first chisel edge and first and second cutting lips, with the first lip extending from the first chisel edge to adjacent to one end of the first longitudinal edge and with the second lip extending from the first chisel edge to adjacent to one end of the fourth longitudinal edge; a first margin formed on the upper surface and along the first longitudinal edge, from its one end to adjacent to the middle section of the member, with the remaining land portion of the upper surface, between the first and second longitudinal edges and between the first end and the middle section of the member, having a reduced diameter body diameter clearance; a second margin formed on the lower surface and along the fourth longitudinal edge, from its one end to the middle section of the member, with the remaining land portion of the lower surface, between the third and fourth longitudinal edges and between the one end and the middle section of the member, having a reduced diameter body diameter clearance; a second drill body formed on the second end of the member and including a centrally disposed second chisel edge and third and fourth cutting lips, with the third lip extending from the second chisel edge to adjacent to the other end of the second longitudinal edge and with the fourth lip extending from the second chisel edge to adjacent to the other end of the fourth longitudinal edge; a third margin formed on the upper surface and along the second longitudinal edge, from its other end to adjacent to the middle section of the member, with the remaining land portion of the upper surface, between the first and second longitudinal edges and between the second end and the middle section of the member, having a reduced diameter body diameter clearance; a fourth margin formed on the lower surface and along the third longitudinal edge, from its other end to adjacent to the middle section of the member, with the remaining land portion of the lower surface, between the third and fourth longitudinal edges and between the other end and the middle section of the member, having a reduced diameter body diameter clearance.

2. The improved flat beaded track bit described in claim 1 wherein the surfaces of the first, second, third and fourth margins and of the remaining land portions of the upper and lower surfaces are continuous from the ends of the member to the middle section of the member; wherein the lengths of radii defining the first and second margins and the remaining portions of the upper and lower surfaces adjacent to the first end of the member, are greater adjacent to the one end of the longitudinal edges than adjacent to the middle section of the member; and wherein the lengths of the radii defining the third and fourth margins and the remaining portions of the upper and lower surfaces, adjacent to the second end of the member, are greater adjacent to the other ends of the longitudinal edges than adjacent to the middle section of the member.

3. The improved flat beaded track bit described in claim 2 wherein the first drill body is identical to but a mirror image of the second drill body.

* * * * *